(12) United States Patent
Hanson et al.

(10) Patent No.: US 10,829,845 B2
(45) Date of Patent: Nov. 10, 2020

(54) SELECTIVE THERMAL COATING OF COOLING HOLES WITH AIR FLOW

(71) Applicant: General Electric Company, Schenectady, NY (US)

(72) Inventors: Gerhart LaMoyne Hanson, Simpsonville, SC (US); Eugene Vincent Lajeunesse, Simpsonville, SC (US); Michael Bryan Pezant, Dover, NJ (US); Paul Michael Scorza, Jr., Simpsonville, SC (US); Martin Lewis Smith, Easley, SC (US); Gary Edward Wiesner, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 462 days.

(21) Appl. No.: 15/400,381

(22) Filed: Jan. 6, 2017

(65) Prior Publication Data

US 2018/0195160 A1    Jul. 12, 2018

(51) Int. Cl.
*C23C 4/01* (2016.01)
*B05B 12/12* (2006.01)
(Continued)

(52) U.S. Cl.
CPC ............... *C23C 4/01* (2016.01); *B05B 12/12* (2013.01); *B05B 13/0431* (2013.01); *B05B 13/06* (2013.01); *C23C 4/04* (2013.01); *C23C 4/06* (2013.01); *C23C 4/11* (2016.01); *C23C 4/126* (2016.01); *C23C 4/134* (2016.01); *F01D 5/18* (2013.01); *F01D 5/28* (2013.01); *F01D 5/288* (2013.01); *F01D 9/02* (2013.01); *F01D 9/023* (2013.01); *F01D 9/04* (2013.01); *F01D 9/041* (2013.01); *F01D 25/12* (2013.01);
(Continued)

(58) Field of Classification Search
USPC .............. 118/302, 666, 667, 712, 62, 63, 69
See application file for complete search history.

(56) References Cited

U.S. PATENT DOCUMENTS

| 4,338,360 A | 7/1982 | Cavanagh et al. |
| 4,402,992 A | 9/1983 | Liebert |

(Continued)

OTHER PUBLICATIONS

Extended European Search Report and Opinion issued in connection with corresponding EP Application No. EP17206058.4 dated Jul. 19, 2018.

*Primary Examiner* — Yewebdar T Tadesse
(74) *Attorney, Agent, or Firm* — Hoffman Warnick LLC

(57) ABSTRACT

A system according to various embodiments can include: a coating system configured to apply a thermal coating material to a component, the component having a plurality of cooling holes; an airflow system coupled with the coating system, the airflow system configured to force air through the component; and a control system coupled with the airflow system and the coating system, the control system configured to: detect coating instructions for the coating system, the coating instructions instructing the coating system to apply the thermal coating material to a subset of the plurality of cooling holes; and instruct the airflow system to force air through the subset of the plurality of cooling holes during application of the thermal coating material to the component in response to detecting the coating instructions.

9 Claims, 3 Drawing Sheets

(51) Int. Cl.
   *F01D 5/28* (2006.01)
   *F01D 9/02* (2006.01)
   *F23R 3/04* (2006.01)
   *F01D 25/24* (2006.01)
   *F01D 9/04* (2006.01)
   *C23C 4/11* (2016.01)
   *C23C 4/06* (2016.01)
   *B05B 13/06* (2006.01)
   *B05B 13/04* (2006.01)
   *C23C 4/126* (2016.01)
   *C23C 4/134* (2016.01)
   *C23C 4/04* (2006.01)
   *F01D 5/18* (2006.01)
   *F01D 25/12* (2006.01)
   *F02C 7/12* (2006.01)
   *F23R 3/00* (2006.01)
   *F01D 5/00* (2006.01)

(52) U.S. Cl.
   CPC ........... *F01D 25/24* (2013.01); *F01D 25/243* (2013.01); *F02C 7/12* (2013.01); *F23R 3/002* (2013.01); *F23R 3/04* (2013.01); *F01D 5/005* (2013.01); *F05D 2220/32* (2013.01); *F05D 2230/312* (2013.01); *F05D 2230/90* (2013.01); *F05D 2240/35* (2013.01); *F05D 2260/202* (2013.01); *F05D 2260/607* (2013.01); *F05D 2300/5023* (2013.01); *F05D 2300/611* (2013.01)

(56) References Cited

U.S. PATENT DOCUMENTS

| | | |
|---|---|---|
| 6,004,620 A | 12/1999 | Camm |
| 6,365,013 B1 | 4/2002 | Beele |
| 6,524,395 B1 | 2/2003 | Devine, II |
| 6,667,076 B2 | 12/2003 | Fried et al. |
| 7,717,677 B1 * | 5/2010 | Liang .................... F01D 5/183 415/115 |
| 8,985,049 B2 | 3/2015 | Bellino et al. |
| 2006/0228465 A1 * | 10/2006 | Zurecki .................. C21D 1/613 427/8 |
| 2008/0268164 A1 * | 10/2008 | Thayer .................... C23C 8/04 427/446 |
| 2009/0226626 A1 | 9/2009 | Gupta et al. |
| 2012/0087802 A1 | 4/2012 | von Niessen et al. |
| 2013/0026365 A1 | 1/2013 | Jahnke et al. |
| 2013/0108425 A1 * | 5/2013 | Norris .................. F01D 11/005 415/191 |
| 2014/0272104 A1 * | 9/2014 | DePalma, III ............ C23C 4/01 427/8 |

* cited by examiner

US 10,829,845 B2

SELECTIVE THERMAL COATING OF COOLING HOLES WITH AIR FLOW

FIELD OF THE INVENTION

The subject matter disclosed herein relates to fabrication of materials in turbomachinery. More particularly, the subject matter disclosed herein relates to coating components in turbomachinery.

BACKGROUND OF THE INVENTION

A challenge in turbomachinery (e.g., gas turbomachines) manufacturing and maintenance is keeping component cooling holes free from obstruction, for example, when applying coating to turbomachine components. In particular, thermal spray coatings can block cooling holes in components, requiring costly, labor-intensive processes such as cutting using diamond-coated tools and/or carbide tools on a large number (e.g., tens or hundreds) of holes.

BRIEF DESCRIPTION OF THE INVENTION

Various embodiments of the disclosure include approaches for selectively flushing cooling holes in components (e.g., gas turbine components) during a coating process. A system according to various embodiments can include: a coating system configured to apply a thermal coating material to a component, the component having a plurality of cooling holes; an airflow system coupled with the coating system, the airflow system configured to force air through the component; and a control system coupled with the airflow system and the coating system, the control system configured to: detect coating instructions for the coating system, the coating instructions instructing the coating system to apply the thermal coating material to a subset of the plurality of cooling holes; and instruct the airflow system to force air through the subset of the plurality of cooling holes during application of the thermal coating material to the component in response to detecting the coating instructions.

A second aspect of the disclosure includes a computer program product having program code embodied in a computer readable storage medium, which when executed by at least one computing device, causes the at least one computing device to control a coating system configured to apply a thermal coating material to a component having a plurality of cooling holes by perform actions including: detecting coating instructions for the coating system, the coating instructions instructing the coating system to apply the thermal coating material to a subset of the plurality of cooling holes; and instructing an airflow system coupled with the component to force air through the subset of the plurality of cooling holes during application of the thermal coating material to the component in response to detecting the coating instructions.

A third aspect of the disclosure includes a computer-implemented method for controlling a coating system configured to apply a thermal coating material to a component having a plurality of cooling holes, the method including: detecting coating instructions for the coating system, the coating instructions instructing the coating system to apply the thermal coating material to a subset of the plurality of cooling holes; and instructing an airflow system coupled with the component to force air through the subset of the plurality of cooling holes during application of the thermal coating material to the component in response to detecting the coating instructions.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
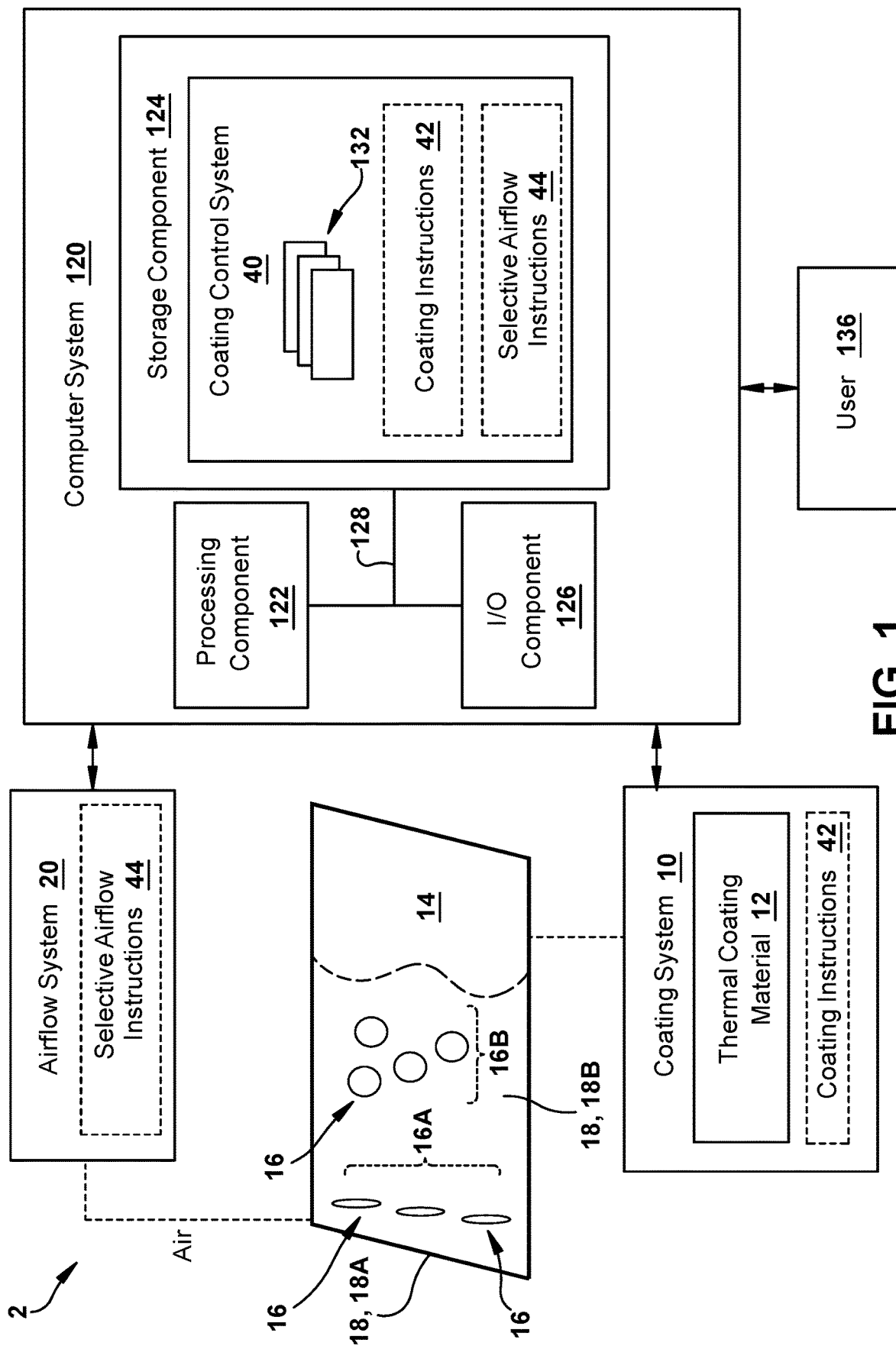
FIG. 1 shows a schematic depiction of an environment including a system according to various embodiments of the disclosure.

It is noted that the drawings of the various aspects of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated herein, the subject matter disclosed relates to fabrication of materials in turbomachinery. More particularly, the subject matter disclosed herein relates to selective thermal coating of components in turbomachines, e.g., using a thermal spray coating such as a thermal barrier coating (TBC).

As noted herein, applying thermal spray coatings can block cooling holes in components, requiring costly, labor-intensive processes such as cutting using diamond-coated tools and/or carbide tools on a large number (e.g., tens or hundreds) of holes. Conventional approaches for maintaining unobstructed cooling holes during thermal coating include forcing air or an inert gas through all cooling holes in a component during an entire coating process. While these conventional approaches may prevent closure of some cooling holes, the volume of air or inert gas, along with the extended exposure time, causes the component to cool undesirably. An over-cooled component is less able to bond with the thermal spray coating, creating a coating with a higher potential to degrade during use.

In contrast to conventional approaches, various aspects of the disclosure include systems and methods for selectively preventing obstruction of cooling holes in components during a thermal spraying process. In some cases, a control system is coupled with a coating robot, and detects instructions for coating particular sections of a component. In response to detecting instructions for coating a particular section of the component, control system initiates a flow of air through cooling holes in that section of the component in order to prevent those cooling holes from being obstructed by the thermal coating material (e.g., TBC). In some cases, the control system is coupled to an airflow system that includes a rotary air slip ring. During some coating processes, the component rotates on a turntable, dolly or other platform, while the coating robot remains stationary or moves only a limited number of degrees around the component. The rotary air slip ring in the systems disclosed herein can allow the component to completely rotate (and over-rotate, e.g., 360+ degrees) without tangling air supply lines. With complete freedom to rotate the component, the system can more efficiently coat that component, saving time and expense. Additionally, by selectively forcing air through cooling holes, the system can prevent over-cooling the component, thereby increasing the quality of the coating when compared with conventional approaches. In other coating processes, the component is placed or otherwise mounted on a platform, and a coating robot moves around the platform to apply a coating. It is understood that in still other coating processes, the component can be placed on a turntable, dolly or other platform, and can rotate a limited number of degrees, while coating robot is also configured to move about the component a limited number of degrees. In any case, the systems described herein can improve the process of coating a component relative to conventional systems and approaches.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Figure 2:
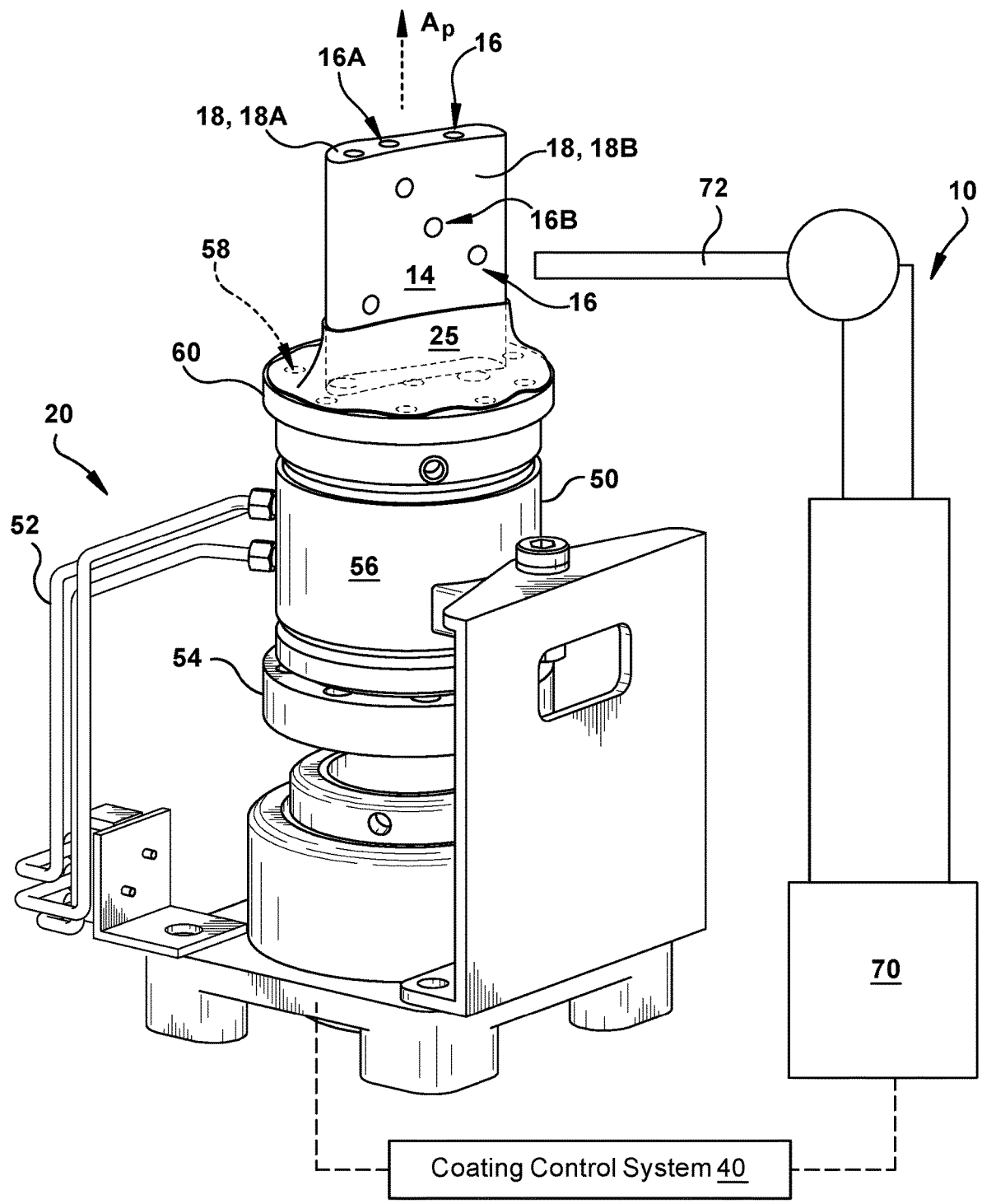
FIG. 2 shows a close-up schematic depiction of components of the system of FIG. 1.

FIG. 1 shows a schematic depiction of an environment including a system 2 according to various embodiments of the disclosure. As shown, system 2 can include a coating system 10 configured to apply a thermal coating material 12, e.g., a thermal barrier coating, to a component 14. In some cases, thermal barrier coating (TBC) can include a conventional TBC having multiple layers (e.g., four layers: metal substrate, metallic bond coat, thermally-grown oxide (TGO), and ceramic topcoat), but may include any other conventional thermal coating material 12 known in the art. FIG. 2 shows a close-up schematic depiction of coating system 10 along with an airflow system 20, further described herein. Coating system 10 can include a robotic coating system, including, e.g., an applicator and a material reservoir (or source line), as is known in the art. In some cases, coating system 10 includes at least one of a robot applicator, an aerosol printer an ink-jet printer or a manual spray system (e.g., operated by a human operator, and configured to send an indication that coating is applied to a particular portion of component 14, e.g., to control system 40).

In various embodiments, component 14 has a plurality of cooling holes 16, which may include distinct subsets of cooling holes 16A, 16B, etc., located in regions 18 of component 14. That is, in various embodiments, subsets of cooling holes 16A, 16B, can have distinct flow paths running therethrough, such that fluid flow through one subset of cooling holes 16A will not flow through a distinct subset of cooling holes 16B, etc. In some cases, cooling holes 16A located in one region, e.g., region 18A, may have a distinct geometry from cooling holes 16B in a distinct region, e.g., region 18B, such as where region 16A includes leading edge cooling holes versus mid-span cooling holes in region 16B. In some cases, component 14 can include a turbomachine component, which includes cooling holes 16 for allowing the flow of cooling fluid therethrough, e.g., during operation of a turbomachine employing the component 14. Component 14, in some cases, can include at least one of a turbomachine blade, nozzle, bucket, shroud, flange, and/or a combustion hardware component such as a liner, a can, a transition piece, a cover plate, etc.

Airflow system 20 is coupled (e.g., via wireless and/or hardwired means) with coating system 10, and is configured to force air (e.g., ambient air, treated air, or other treated gas) through component 14. In various embodiments, as shown in the schematic depiction of system 2 in FIG. 2, airflow system 20 is fluidly connected with component 14 such that airflow system 20 can initiate a flow of air through one or more regions 18 of component 14 to selectively flush one or more subsets of cooling holes 16A, 16B, etc.

Figure 3:
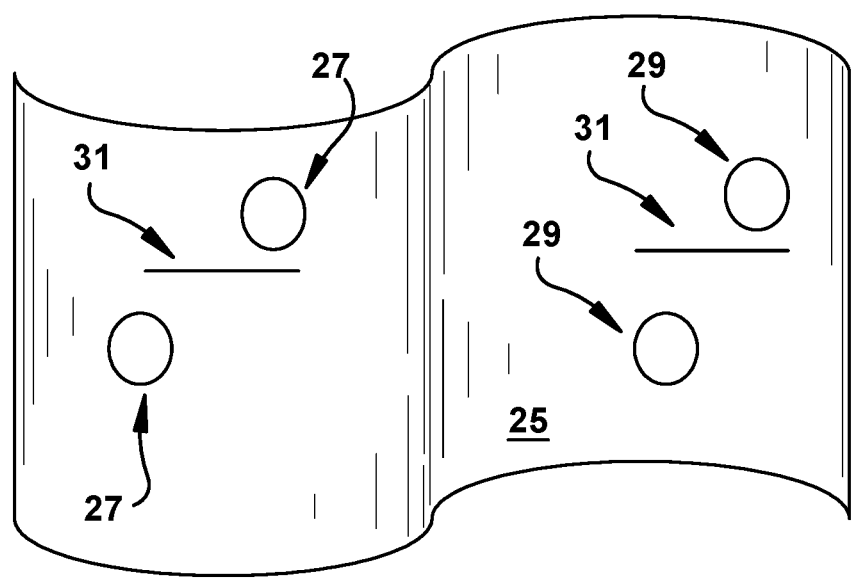
FIG. 3 shows a close-up schematic depiction of manifold according to various embodiments of the disclosure.

System 2 further includes a control system (coating control system) 40 coupled (e.g., via wireless and/or hardwired means) with airflow system 20 and coating system 10, via a computer system 120 (also referred to as a computing device). In various embodiments, coating control system 40 is configured to control airflow system 20 to selectively force air through cooling holes 16. Coating control system 40 can include any conventional electrical and/or mechanical control systems, and in various embodiments, may include logic configured to provide instructions to airflow system 20 and/or coating system 10 according to particular inputs, as described herein. In various embodiments, coating control system 40 is configured to perform actions including:

A) Detect coating instructions 42 for coating system 10, where coating instructions 42 instruct coating system 10 to apply thermal coating material 12 to a subset 16A, 16B of the plurality of cooling holes 16. In some cases, coating instructions 42 can include data about characteristic(s) of component 14, and can include computer-aided design (CAD) data such as coordinate data, log data, model data (e.g., two-dimensional and/or three-dimensional model data), that coating control system 40 obtains from a data model (stored in CAD data) of component 14. Coating instructions 42 can also include data about types of thermal coating material 12 to be applied to cooling holes 16, angles at which coating system 10 should apply thermal coating material 12, application speed, flow rate, intensity, etc. In various embodiments, the characteristic of cooling holes 16 in component 8 can include at least one of a size of each of the plurality of cooling holes, a shape of each of the plurality of cooling holes, a type of each of the plurality of cooling holes or a location of each of the plurality of cooling holes (e.g., in regions 18A, 18B, etc.); and B) In response to detecting coating instructions 42 (including selective coating of subset 16A, 16B, etc. of cooling holes 16), instruct airflow system 20, via selective airflow instructions 44 to force air through subset 16A, 16B of cooling holes 16 during application of thermal coating material 12 to the component 14. In particular embodiments, airflow system 20 can include an air supply manifold 25 sized to engage with component and configured to selectively supply air through subsets 16A, 16B, etc. of cooling holes 16 during application of thermal coating material 12 to component 14. In some cases, air supply manifold 25 includes a series of fluid inlets 27 and outlets 29 for coupling with particular cooling holes 16 in component 14, as shown in the close-up schematic depiction of manifold 25 in FIG. 3. That is, air supply manifold 25 can include independent cooling channels (including inlets 27 and outlets 29) which can be selectively engaged via one or more actuators 31, e.g., via dividing walls, valves, sliding partitions, etc. to fluidly couple with particular subsets 16A, 16B of cooling holes 16. Referring to FIGS. 1-3, in various embodiments, as discussed herein, control system 40 detects coating instructions 42 prior to application of thermal coating material 12 by coating system 10 in order to initiate the flow of air through select cooling holes 16 prior to coating. In various embodiments, airflow system 20 may selectively force air through the subset, e.g., 16A of cooling holes during one or more coating processes. That is, in some cases airflow system 20 may be configured to force air through only the subset, e.g., 16A of cooling holes during a coating process. For example, in some cases, component 14 can be coated in one or more stages, and one or more layers, of thermal coating material 12. In some cases, coating system 10 applies a metallic bondcoat, and (subsequently) a coating (e.g., thermal barrier coating (TBC)) to component 14 while airflow system 20 forces air through one or more subsets 16A, 16B, etc. of cooling holes 16. In the case that the thermal coating material 12 includes a TBC coating, the TBC can be blanket applied in some cases. It is understood, however, that the coating process may have several sub-processes. For example, a first coating process can include a bond coat, applied through air-plasma spray (APS) process or a high-velocity-oxygen-fuel (HVOF) process, or a combination of these processes. The following coating may include the TBC, applied using an APS process. According to various embodiments, the selective airflow instructions 44 used in each process can be distinct. For example, bond coat is a lower-temperature process that employs high-velocity particles (similar to grit blasting). TBC, on the other hand, is a relatively higher-temperature process. Using TBC may require a greater rate of airflow through one or more cooling holes than bond coat. It is understood that according to various embodiments, other coating processes may be employed, e.g., environmental barrier coating (EBC), in the case that component 14 includes a composite. In various embodiments, additional coating materials may be used, in the first coating process and/or the second coating process. For example, additional coating materials can include ceramic materials and/or ceramic-similar materials, such as aluminum-oxide, zirconium-oxide, hafnium-oxide, Yttria-stabilized zirconium-oxide and/or their derivatives. Additionally, coating materials can include graphite, as well as metallic materials such as cobalt-chromium-molybdenum. It is understood that according to various embodiments, prior the process of coating, an additional process can include grit blasting the exposed surfaces of component 14 to achieve a desired surface roughness. These processes may be interposed between, or performed before/after processes described with reference to FIG. 1 and/or FIG. 2.

In various embodiments, coating control system 40 is configured to instruct airflow system 20, via selective airflow instructions 44, to stop forcing air through subset 16A, 16B of cooling holes 16 after thermal coating material 12 has been applied to component 14. That is, after coating a particular region 18A, 18B, etc., or as a distinct region 18A, 18B, etc. of component is coated, airflow system 20 is instructed to stop forcing air through cooling holes 16 in the prior-coated region 18A, 18B, etc.

Returning to FIG. 2, a schematic close-up view of airflow system 20 and coating system 10 is shown. In some embodiments, and in contrast to conventional systems, airflow system 20 can include a rotary air slip ring 50 for forcing air through component 14. Rotary air slip ring 50 is coupled to a feed line 52, and includes a rotating wheel 54 which rotates to pull ambient air through feed line 52, into a chamber 56, and up through outlet apertures 58 in a platform 60. In some cases, component 14 is placed on platform 60 and sealed, e.g., via a dressing or adhesive material such as tape, wrapping, etc., to outlet apertures 58 to allow airflow through component 14. In various embodiments, rotary air slip ring 50 permits the component 14 to rotate greater than 360 degrees about a primary axis ($A_p$) of airflow system 20 without limiting airflow to component 14. That is, in various embodiments, coating system 10 includes a coating robot that is configured to remain stationary during application of the thermal coating material 12 (FIG. 1). In this sense, coating system 10 includes a base 70, and an applicator 72 for applying thermal coating material 12 to component 14. While applicator 72 may be movable across a variety of positions, in many cases, base 70 is designed to remain stationary during application of thermal coating material 12 to component 14. Using rotary air slip ring 50 permits component 14 to rotate, on platform 60, without limiting airflow to component 14. That is, in contrast to conventional systems, rotary air slip ring 50 does not include moving feed lines which can become tangled as a component 14 is rotated. The rotation of wheel 54 creates a vacuum within chamber 56, thereby pulling air through feed lines 52 for use in clearing cooling holes 16 in component 14 (via apertures 58). Because this vacuum is created regardless of the position of platform 60, rotary air slip ring 50 allows component 14 to be rotated one or more revolutions (as well as clockwise and counterclockwise) to more efficiently coat sections 18A, 18B, etc. of component 14.

Returning to FIG. 1, computer system 120 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as coating control system 40, which is at least partially embodied in storage component 124. While executing program code, processing component 122 can process data, which can result in reading and/or writing the data to/from storage component 124 and/or I/O component 126 for further processing. Pathway 128 provides a communications link between each of the components in computer system 120. I/O component 126 can comprise one or more human I/O devices or storage devices, which enable a user 136 (e.g., human or machine user) to interact with computer system 120 and/or one or more communications devices to enable user 136 (e.g., human or machine user) to communicate with computer system 120 using any type of communications link. To this extent, coating control system 40 can manage a set of interfaces (e.g., graphical user interface(s), application program interface, and/or the like) that enable human and/or system interaction with coating control system 40.

In any event, computer system 120 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, coating control system 40 can be embodied as any combination of system software and/or application software. In any event, the technical effect of computer system 120 is to selectively force air through cooling holes 16 during coating, based upon coating instructions 42 for a component 14.

Further, coating control system 40 can be implemented using a set of modules 132. In this case, a module 132 can enable computer system 20 to perform a set of tasks used by coating control system 40, and can be separately developed and/or implemented apart from other portions of coating control system 40. Coating control system 40 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 120.

When computer system 120 comprises multiple computing devices, each computing device may have only a portion of coating control system 40 embodied thereon (e.g., one or more modules 132). However, it is understood that computer system 120 and coating control system 40 are only representative of various possible equivalent computer systems that may perform a process described herein. To this extent, in other embodiments, the functionality provided by computer system 120 and coating control system 40 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 120 includes multiple computing devices, the computing devices can communicate over any type of communications link. Further, while performing a process described herein, computer system 120 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, coating control system 40 enables computer system 120 to control coating of a (e.g., turbomachine) component 14. Coating control system 40 may include logic for performing one or more actions described herein. In one embodiment, coating control system 40 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, coating control system 40 and logic included therein will be described herein as a specific use machine. As will be understood from the description, while logic is illustrated as including each of the above-stated functions, not all of the functions are necessary according to the teachings of the embodiments of the invention as recited in the appended claims.

In various embodiments, processes described herein can be iterated (repeated) periodically (e.g., according to schedule of x times per y period, and/or continuously) in order to aid in coating of one more portion(s) of one or more (turbomachine) component(s) 14. In some cases, one or more of the processed described herein can be repeated, for example, for a set of components 14 (e.g., turbomachine components).

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system comprising:
a coating system configured to apply a thermal coating material to a component, the component having a plurality of cooling holes having distinct flow paths within the component such that fluid will flow through a first distinct subset of cooling holes and will not flow through a second distinct subset of cooling holes;
an airflow system coupled with the coating system, the airflow system configured to force air through the component, wherein the air flow system includes a plurality of independent cooling channels, each of the plurality of independent cooling channels selectively coupled to a distinct subset of the plurality of cooling holes; and
a control system coupled with the airflow system and the coating system, the control system configured to:
detect coating instructions for the coating system, the coating instructions instructing the coating system to apply the thermal coating material to a surface of the first distinct subset of the plurality of cooling holes; and
instruct the airflow system to force air only through the first distinct subset of the plurality of cooling holes during application of the thermal coating material to the component in response to detecting the coating instructions.

2. The system of claim 1, wherein the airflow system further includes a rotary air slip ring for forcing the air through the component.

3. The system of claim 2, wherein the rotary air slip ring permits the component to rotate greater than 360 degrees about a primary axis of the airflow system without limiting air flow to the component.

4. The system of claim 3, wherein the coating system includes a coating robot.

5. The system of claim 4, wherein the coating robot is configured to remain stationary during application of the thermal coating material.

6. The system of claim 1, wherein the thermal coating material includes a thermal barrier coating (TBC).

7. The system of claim 1, wherein the control system detects the coating instructions prior to the application of the thermal coating material by the coating system.

8. The system of claim 1, wherein each distinct subset of the plurality of cooling holes includes cooling holes within a single region of the component.

9. The system of claim 1, wherein the component includes a gas turbine (GT) component.

* * * * *